June 14, 1932. E. E. GREVE 1,863,111

OIL AND GAS SEPARATOR

Filed May 25, 1928

INVENTOR
E. E. Greve
by W. F. Doolittle
Attorney.

Patented June 14, 1932

1,863,111

UNITED STATES PATENT OFFICE

EDGAR E. GREVE, OF BELLEVUE, PENNSYLVANIA, ASSIGNOR, BY MESNE ASSIGNMENTS, TO OIL WELL SUPPLY COMPANY, OF PITTSBURGH, PENNSYLVANIA, A CORPORATION OF NEW JERSEY

OIL AND GAS SEPARATOR

Application filed May 25, 1928. Serial No. 280,523.

My invention relates to an oil and gas separator, and particularly to a separator of the character used in the oil and gas fields for separating crude petroleum and the materials contained therein in the condition in which the same are discharged from the well.

The prime object of the present invention is to provide a simple and efficient separator of the type specified, capable of handling large quantities of crude petroleum or oil, and effectively separating therefrom, for example, gas, water and sand.

Other objects and advantages of my invention will be either particularly pointed out herein or become apparent from a consideration of the following specification taken in connection with the accompanying drawing.

Figure 2:
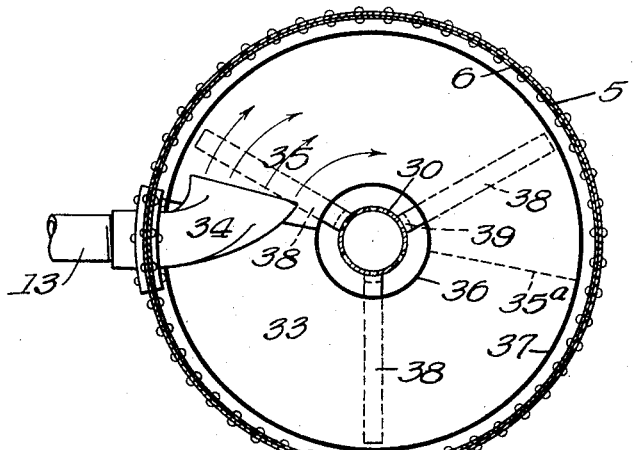
Figure 1:
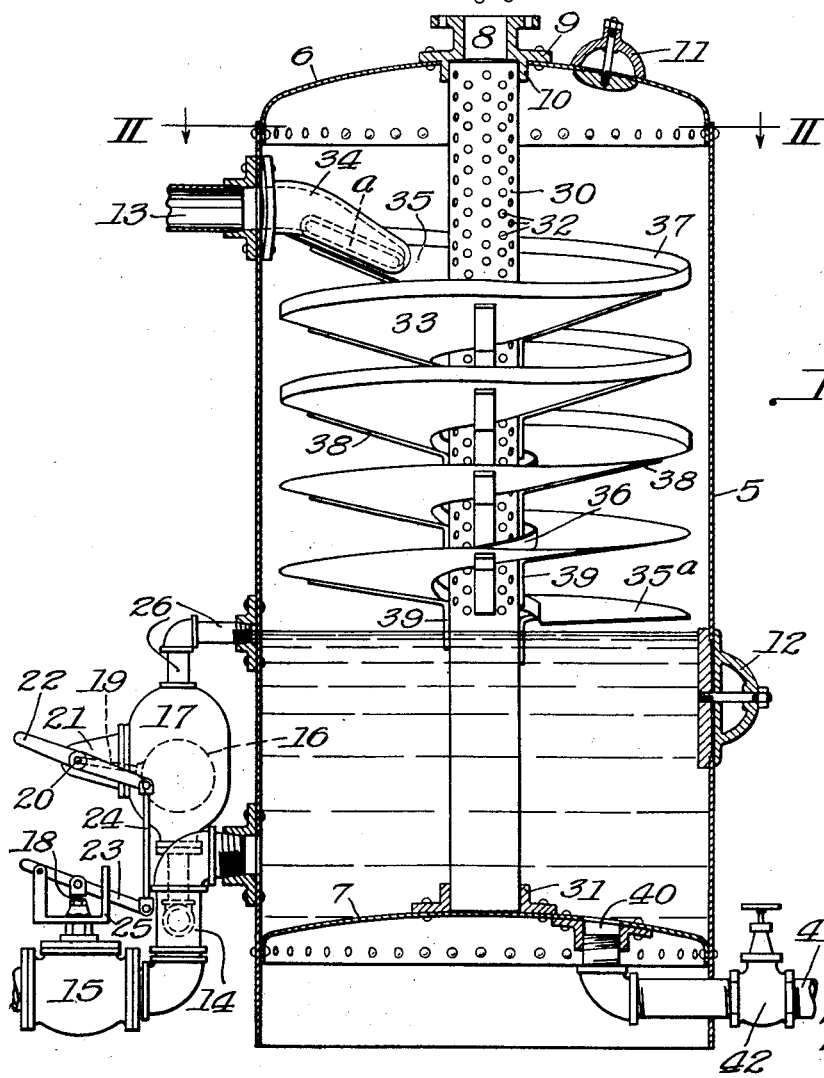

In the accompanying drawing, which illustrates an application of my invention;

Fig. 1 is a part vertical sectional view and a part elevational view of a separator apparatus embodying my invention; and Fig. 2 is a part plan and a part sectional view, taken on line II—II of Fig. 1.

Referring to the drawing, and as illustrated and as preferred, the gas and oil separator embodying my invention comprises a cylindrical tank 5 having its upper end closed by a top or closure member 6, and its lower end closed by a bottom plate 7. Both the top and the bottom closures 6 and 7 are riveted or otherwise securely attached to the tank. Top 6 is formed with a central opening adapted to receive a portion of a connector or coupling 8, having a flange 9, through which rivets are passed for connecting the said connector to the top of the tank, and a depending annular flange 10 entered into the tank. Member 8 is designed to couple up a gas outlet pipe, not shown, with the tank, by which the separated gas may be led to any desired point.

The tank is also provided with man-holes having closure means 11 and 12 and with openings in communication with an oil and gas inlet pipe 13, an oil outlet opening in register with an oil outlet piping 14, the flow of oil through the piping being controlled by a valve structure 15.

The opening and closing of the valve structure 15 is effected automatically by means of a float 16 disposed within a float-box 17 and the connections interposed between the float and the valve stem 18 of the valve structure 15. The said connections, as illustrated, include a connecting rod 19 having one end secured to the float 16 and its other end rigidly secured to a pin 20, the latter being passed through an extension 21 of the float-box, and projecting therefrom to support an operating lever 22. Lever 22 is fixed to the pin 20 and is rocked by said pin when the pin is turned by the float and its connection 19. The opposite end of the lever 22 is joined to a lever 23 by a rod 24, said lever 23 being in turn secured to the valve stem 18. 25 is a support for the lever 23.

Oil from the tank is admitted to the float-box 17 through an oil outlet piping 26; this admitted oil raises float 16 and effects, through the means described, an opening of the valve controlling the passage of oil from the tank.

Located within and centrally disposed in the tank is a perforated gas outlet pipe 30. This pipe extends from the top member of the tank to its bottom member, and has its upper end entered in the depending annular flange 10 and its lower end positioned within the flanged portion of a receiving member 31, the latter secured to the interior of the lower closure 7. This construction provides a slip joint connection at the upper and lower ends of the pipe 30 to provide for the expansion and contraction of the tank structure. The purpose of the pipe 30 is to permit of the liberated gases being passed out of the tank. The perforations 32 may extend for any desired distance.

Surrounding the gas discharge pipe 30, I provide a spiral race-way or means for passing the crude oil in a relatively thin winding stream downwardly from its entrance into the tank to a desired point above the bottom of the tank. This race-way or means, indicated generally by 33, provides an annular downwardly sloping conduit or pathway for the oil, and is of such a character as to thoroughly separate the constituents of the oil during the travel of the stream of oil down the same according to their specific gravity.

As shown and as preferred, the crude oil is delivered onto the spiral means by the nozzle member 34 connected to the supply pipe 13. This nozzle has a relatively wide discharge orifice $a$ to introduce the oil in a broad flat stream, and the nozzle discharge orifice is disposed tangentially to the tank and inclined, so as to be coincident with the inclination pitch or bank of the portion 35 of the race-way.

In this connection, attention is called to the fact that the inclination of portion 35 of the race-way progressively diminishes until said portion is flat or substantially flat, as shown at 35$a$. For convenience of construction, the race-way is made up of a series of members all provided with an inner peripheral oil retaining flange 36, and some provided with similar outer peripheral flanges 37. These members are designed to encircle the gas outlet pipe and be supported therefrom by radially extending arms 38 welded to said pipe 30 by bent portions 39.

Sand and other foreign matter that may settle at the bottom of the tank may be removed through an opening 40 of the bottom 7 and drainage outlet pipe connection 41 controlled by a valve 42.

In the operation of my improved separator, the crude oil is introduced onto the upper end of the spiral structure 33 by the nozzle 34 and is caused to flow by gravity and pressure in a circuitous path from the top to the bottom of said structure. During this travel, the moving stream of oil is subjected to a certain breaking-up action sufficient to separate the contained heavy particles and the gas, but not to a sufficient agitation to separate the lighter oils or lighter hydrocarbons from the heavier series of oils.

In operation, the heavy particles, due to the configuration of the means 33 and the velocity of the broad flat stream will be caused to flow over the flanges 37 and out of the path of the out-going gas. This removal of the heavy particles may be effected before the lower portion of the path of travel is reached. It will be understood that, due to the progressively diminishing inclination or bank of the race-way from its upper end toward its lower end, until it finally assumes a substantially flat circular flow path, the velocity of the stream of oil is gradually lessened and will flow over the rim of the lowermost supporting plate in a relatively thin, slowly moving stream, thereby permitting the remaining gas to escape from this unagitated portion of the flowing stream.

I claim:

1. In an oil and gas separator, the combination with a tank, a crude oil conveyor means located within the tank for imparting a descending circuitous movement to a stream of crude oil for separating matter therefrom according to its specific gravity, said means comprising a banked spiral race-way structure having the inclination of the banked portion gradually diminishing from its top downwardly.

2. In a separator of the class described, a tank adapted to receive material to be separated, a perforated gas outlet pipe mounted for independent expansion within the tank, a banked non-perforated spiral race-way structure therein down which the material is adapted to flow, and said structure being attached to and movable with the pipe and marginally spaced from the adjacent wall of the tank.

3. In a separator of the class described, a tank adapted to receive material to be separated, a perforated gas outlet pipe mounted for independent expansion within the tank, a banked spiral race-way structure therein down which the material is adapted to flow, said structure adjacent the top having a substantially peripheral flange, and said structure being in spaced relation to the upright wall of the tank.

4. In a separator of the class described, a tank adapted to receive material to be separated, a perforated gas outlet pipe within the tank, a conveyor for the material comprising a banked spiral race-way, the inclination of the banked portion varying at different elevations, said conveyor attached to the perforated pipe.

5. In an oil and gas separator, the combination with a tank adapted to receive material to be separated, a banked tortuous substantially imperforate race-way means disposed within the tank, and means to discharge the material onto the race-way in a relatively wide flat stream substantially parallel to that part of the race-way with which it initially contacts to thereby impart a circuitous descending movement to the stream.

6. In an oil and gas separator, the combination with a tank adapted to receive material to be separated, a banked spiral substantially imperforate race-way means disposed within the tank, and means to discharge the material onto the race-way in a relatively wide flat stream substantially parallel to that part of the race-way with which it initially contacts to thereby impart a circuitous descending movement to the stream.

In testimony whereof I affix my signature.

EDGAR E. GREVE.